United States Patent [19]
Akitake et al.

[11] Patent Number: 5,298,936
[45] Date of Patent: Mar. 29, 1994

[54] MODE SELECTING AND DISPLAYING CONTROL APPARATUS FOR CAMERA

[75] Inventors: Hiroshi Akitake, Sagamihara; Minoru Hara, Tokyo; Kazuo Yamamoto, Yokohama, all of Japan

[73] Assignee: Olympus Optical Co., Ltd., Tokyo, Japan

[21] Appl. No.: 995,962

[22] Filed: Dec. 23, 1992

[30] Foreign Application Priority Data

Jan. 10, 1992 [JP] Japan .................. 4-022042

[51] Int. Cl.$^5$ .............................................. G03B 17/18
[52] U.S. Cl. ........................ 354/471; 354/195.13; 354/289.12
[58] Field of Search ............ 354/471, 474, 475, 289.1, 354/289.11, 289.12, 127.1, 127.11, 127.12, 127.13, 195.13

[56] References Cited

U.S. PATENT DOCUMENTS

| | | | |
|---|---|---|---|
| 4,647,176 | 3/1987 | Shimizu et al. | 354/475 |
| 4,931,823 | 6/1990 | Nakajima et al. | 354/289.1 X |
| 5,191,373 | 3/1993 | Nakano | 354/474 |

FOREIGN PATENT DOCUMENTS 2-207232 8/1990 Japan .
2-207233 8/1990 Japan .

*Primary Examiner*—W. B. Perkey
*Attorney, Agent, or Firm*—Frishauf, Holtz, Goodman & Woodward

[57] ABSTRACT

A mode selecting and displaying control apparatus for a camera according to the invention sets a plurality of marks representing set modes in a display state on an LCD panel and sets marks representing other modes in a non-display state while a first switch for setting modes of the camera, e.g., operation modes and flash modes, in a changeable state, is in a non-operated state. By operating a second switch for changing the modes one by one while the first switch is in an operated state, the plurality of marks in a display state are sequentially caused to flicker in accordance with a mode to be set, while marks representing other modes are set in a display state, thereby performing a mode changing operation.

54 Claims, 17 Drawing Sheets

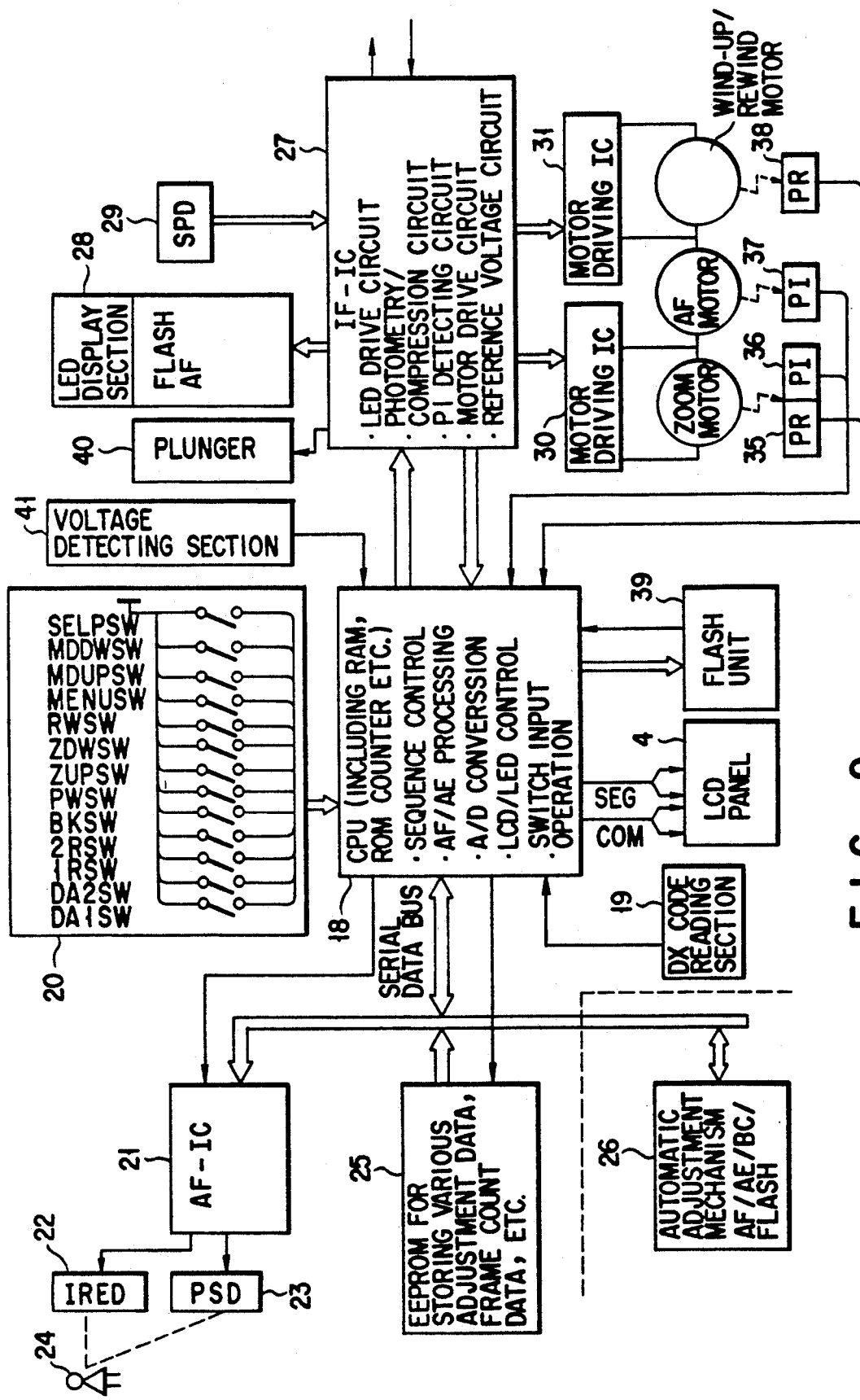
F I G. 9

FIG. 12

| DISPLAY RAM ADDRESS | COM 3 | COM 2 | COM 1 | COM 0 | |
|---|---|---|---|---|---|
| 0 H | | | | | SEG 12 |
| 1 H | ▢ | ▢ | ▢ | | SEG 13 |
| 2 H | ▢ | ▢ | ▢ | ▢ | SEG 14 |
| 3 H | ▢ | ▢ | ▢ | ▢ | SEG 15 |
| 4 H | ▢ | ▢ | ▢ | ▢ | SEG 16 |
| 5 H | | | ⚡ | T̄ | SEG 17 |
| 6 H | FILL-IN | ⚡ OFF | -S | AUTO | SEG 18 |
| 7 H | 📷 | ★ | 📷 | ▣ | SEG 19 |
| 8 H | ▲ | NORMAL | ☺ | ★ | SEG 20 |

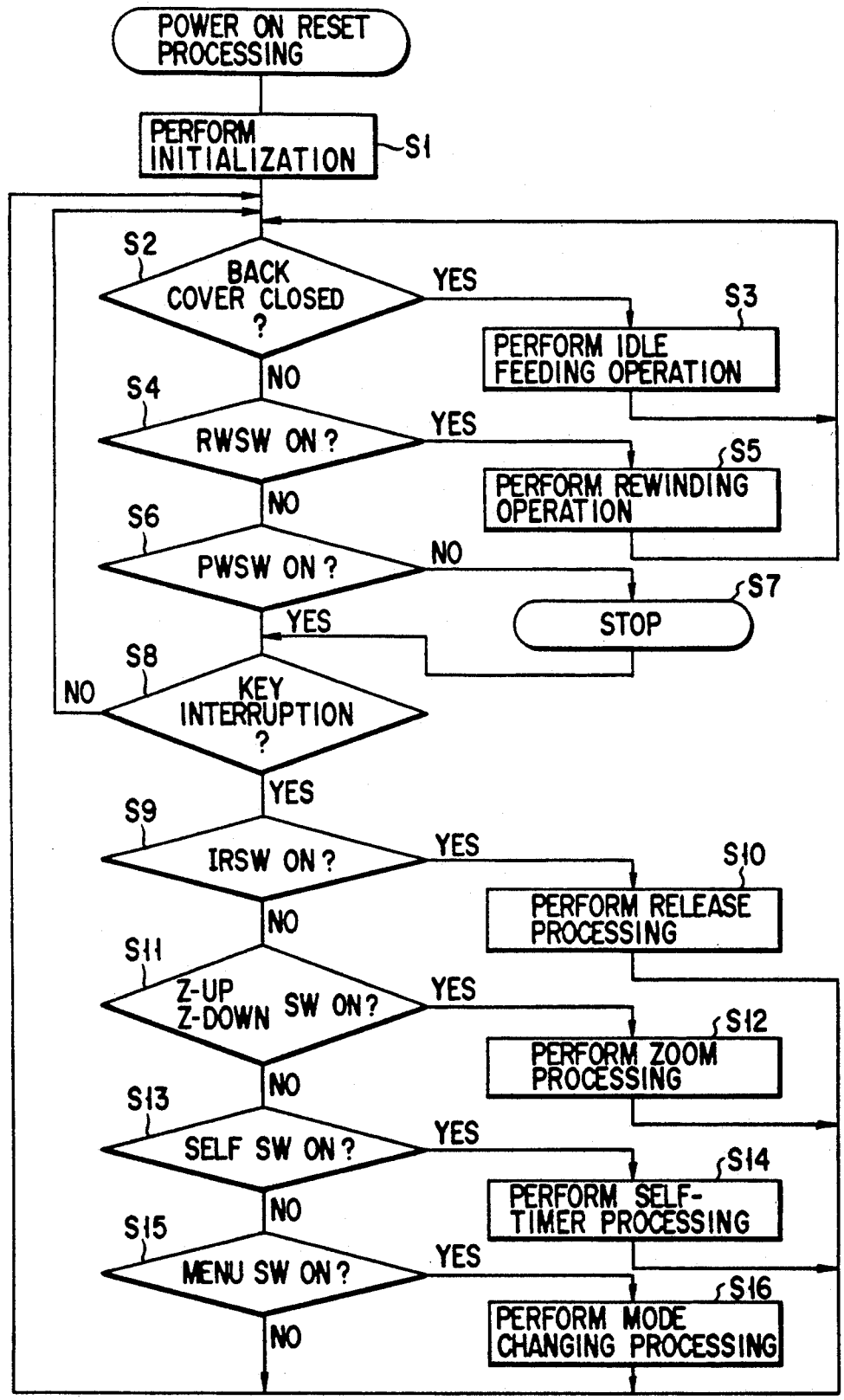
F I G. 13

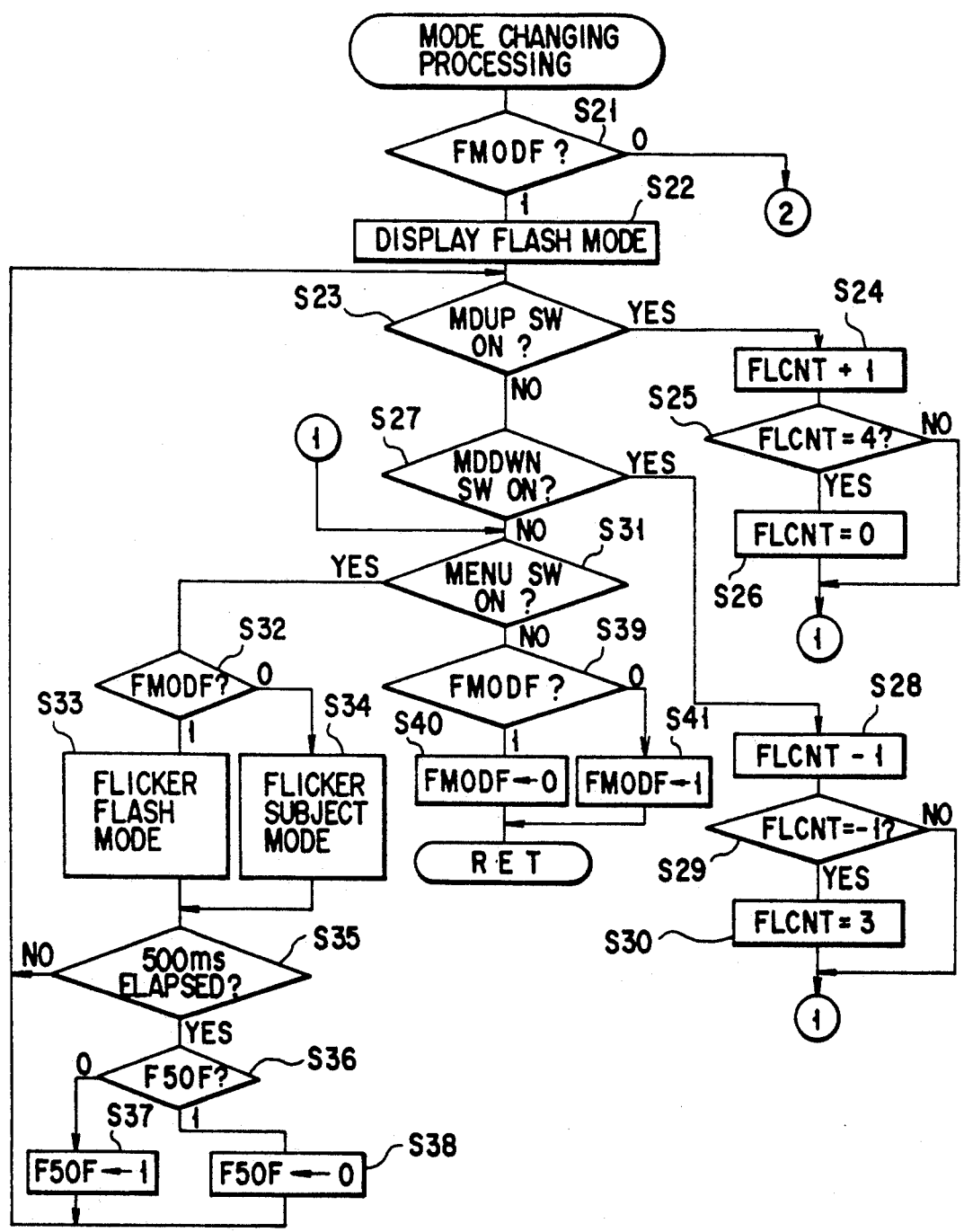
F I G. 14

| FLCNT | FLASH MODE |
|---|---|
| 0 | AUTO |
| 1 | AUTO-S |
| 2 | ↯ OFF |
| 3 | FILL-IN |

F I G. 17

| MDCNT | PHOTOGRAPHIC MODE |
|---|---|
| 0 | NORMAL |
| 1 | 🔲• |
| 2 | 👤 |
| 3 | ☾★ |
| 4 | 🗣 |
| 5 | ⛰ |
| 6 | ★ |

F I G. 18

MODE SELECTING AND DISPLAYING CONTROL APPARATUS FOR CAMERA

BACKGROUND OF THE INVENTION

1. Field of the Invention

The present invention relates to a mode selecting and displaying control apparatus and, more particularly, to a mode selecting and displaying control apparatus used for a camera and designed to facilitate mode selection, in a camera capable of selecting photographic modes, by effectively performing mode selecting and displaying operations.

2. Description of the Related Art

In a conventional camera capable of selecting photographic modes, modes set in the camera, such as an operation mode and a flash mode, are displayed on a display portion of the camera. Such a camera has a flash switch (FLASHSW), a subject switch (SUBJECTSW), a drive switch (DRIVESW), and the like in correspondence with the respective modes. Every time such a switch (SW) is depressed, the displayed mode changes. For example, when the flash switch FLASHSW for the flash mode is consecutively depressed, the displayed mode changes as follows: AUTO (automatic photographic mode) OFF→(automatic photographic mode OFF)→FILL-IN (flash mode)→AUTO.

The camera having such a display portion, however, can display only the current mode. Therefore, if another mode is to be selected, a user must recall which mode can be set next. Otherwise, the user cannot know which mode is displayed next, unless he/she depresses a switch. In addition, the user cannot tell what kinds of modes the camera has.

Especially, as the number of times of mode selection is increased, the above-mentioned inconveniences become conspicuous. Furthermore, in a cyclic display scheme, when a target mode is displayed, and the next mode is subsequently displayed, it requires a cumbersome operation to select the same target mode.

SUMMARY OF THE INVENTION

It is, therefore, an object of the present invention to provide a new and improved mode selecting and displaying control apparatus for a camera which can inform a user of which mode can be set next when the current mode is to be changed in a camera having various operation modes.

According to the present invention, there is provided a mode selecting and displaying control apparatus for a camera, which selects a mode group from a plurality of photographic mode groups in photographing performed by a camera main body, and selects and displays one mode of a selected mode group, comprising:

manually operable first operation means for selecting one mode group from the plurality of photographic mode groups and starting a mode selecting operation from a selected mode group;

second operation means for selecting one mode from the selected mode group after the mode selecting operation is started upon manual operation of the first operation means;

first display control means for displaying all modes belonging to the selected mode group in accordance with the manual operation of the first operation means;

second display control means for flickering/displaying one mode selected in accordance with an operation of the second operation means; and third display control means for confirming the mode selecting operation in accordance with a releasing operation of the second operation means, and displaying only a selected mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A and 1B show a mode selecting and displaying control apparatus for a camera according to an embodiment of the present invention, in which FIG. 1A is a top view of the camera in a state wherein the power is OFF, and FIG. 1B is a front view of the camera in a state wherein the power is OFF;

FIGS. 2A and 2B show the camera in a state wherein the power is ON, in which FIG. 2A is a top view of the camera, and FIG. 2B is a front view of the camera;

FIGS. 5A to 5C show the ON states of a liquid crystal display (LCD) panel 4, in which FIG. 5A shows a state wherein all the marks, i.e., marks 4a to 4o on the LCD panel 4 are turned on, FIG. 5B shows a state wherein the marks 4a, 4b, 4d, and 4h on the LCD panel 4 are turned on, and FIG. 5C shows a state wherein only the marks 4b and 4d on the LCD panel 4 are turned on;

FIGS. 6A and 6B show the display sequences of the LCD panel 4, in which FIG. 6A is a view for explaining a flash mode display sequence, and FIG. 6B is a view for explaining a photographic mode display sequence;

FIGS. 7A to 7C show the display states of the LCD panel 4, in which FIG. 7A shows a state wherein the marks 4d to 4g are turned on and the mark 4d is flickering on the LCD panel 4, FIG. 7B shows a state wherein the marks 4d to 4g are turned on and the mark 4f is flickering on the LCD panel 4, and FIG. 7C shows a state wherein only the marks 4b and 4f are turned on on the LCD panel 4;

FIGS. 8A to 8C show the display states of the LCD panel 4, in which FIG. 8A shows a state wherein the marks 4h to 4o are turned on and the mark 4h is flickering on the LCD panel 4, FIG. 8B shows a state wherein the marks 4d to 4o are turned on and the mark 4k is flickering on the LCD panel 4, and FIG. 8C shows a state wherein only the marks 4b, 4f, and 4k are turned on on the LCD panel 4;

FIG. 9 is a block diagram showing a control circuit for a camera to which the mode selecting and displaying control apparatus of the present invention is applied;

FIG. 12 shows the correspondence between the common lines COM0 to COM3 and the segment lines SEG12 to SEG20, which data are respectively set at display RAM addresses;

FIG. 13 is a flow chart for explaining a power one reset operation to be performed when the power to the camera is turned on;

FIG. 14 is a flow chart of a subroutine for explaining mode change processing;

FIG. 17 shows the correspondence between the values set in a flash mode counter FLCNT and the marks in the flash mode;

FIG. 18 shows the correspondence between the values set in a mode counter MDCNT and the marks in the photographic mode;

FIGS. 19A and 19B show the outer appearance of a camera according to the second embodiment of the present invention, in which FIG. 19A is a top view of the camera, and FIG. 19B is a rear view of the camera;

DETAILED DESCRIPTION OF THE PREFERRED EMBODIMENTS

Figure 1A:
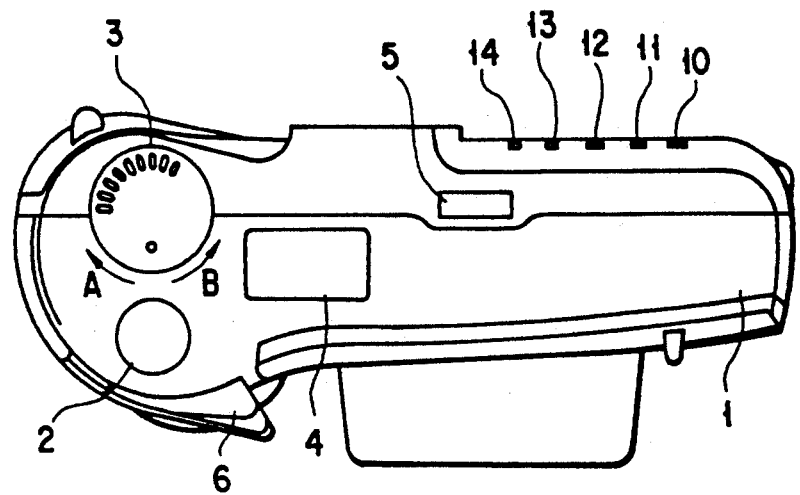
Figure 1B:
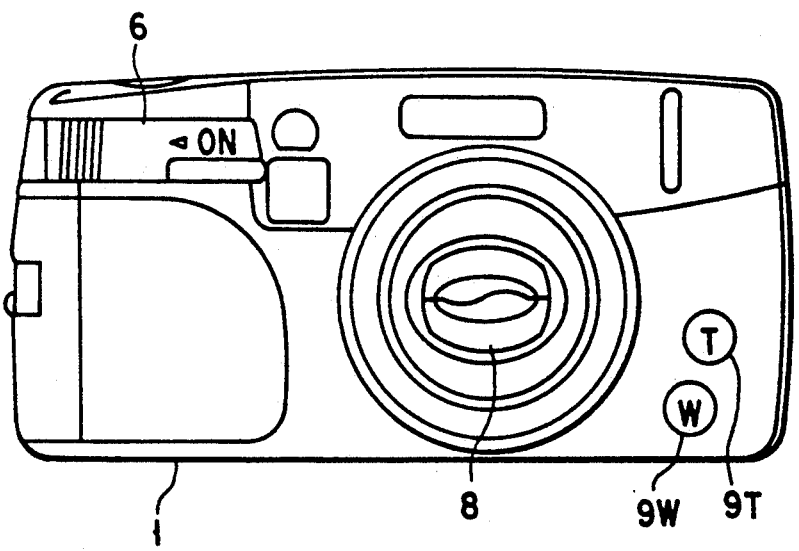

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings.

Figure 2A:
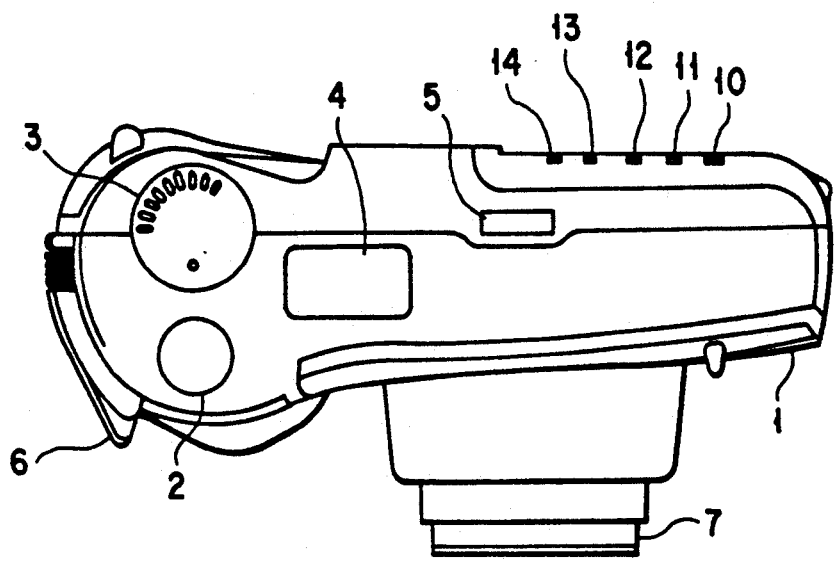
Figure 2B:
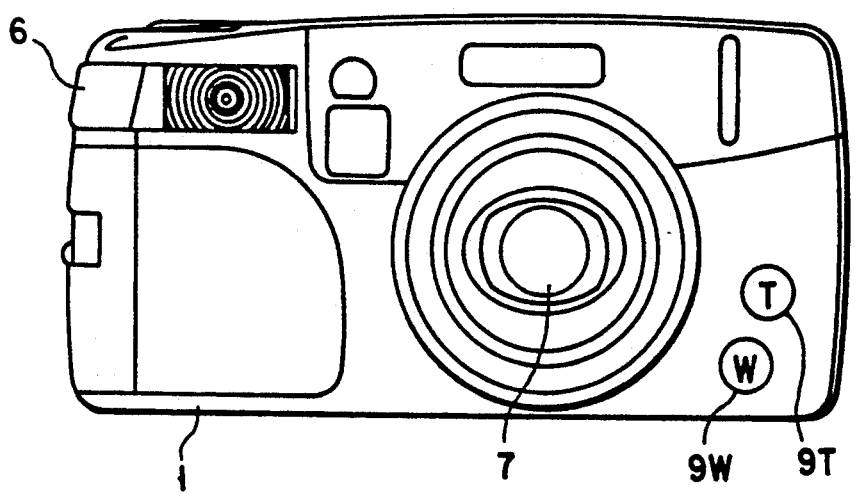
Figure 3:
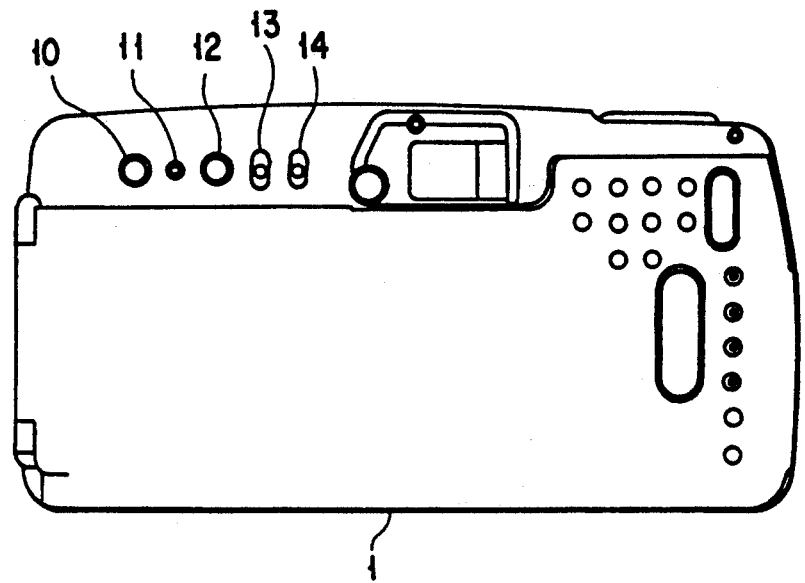
FIG. 3 is a rear view of the camera in FIGS. 1A and 1B.

FIGS. 1A to 3 are views of a mode selecting and displaying control apparatus for a camera according to an embodiment of the present invention, illustrating the outer appearance of the camera. FIGS. 1A and 1B show the camera in a state wherein the power is OFF. FIGS. 1A and 1B are top and front views of the camera, respectively. FIGS. 2A and 2B show the camera in a state wherein the power is ON. FIGS. 2A and 2B are top and front views of the camera, respectively. FIG. 3 is a rear view of the camera.

As shown in FIGS. 1A to 3, a release button 2, a menu select dial 3, a liquid crystal display (LCD) display 4, and a date display portion 5 are arranged on the top surface of a camera main body 1. The menu select dial 3 can be pivoted in the directions indicated by arrows A and B in FIG. 1A and is used to select various modes and information. In addition, a power switch 6, a barrier 8, zoom buttons 9T and 9W, and the like are arranged on the front surface of the camera main body 1. The power switch 6 is used to supply power from a battery (not shown) to a control circuit (to be described later) for the camera main body 1. The barrier 8 is arranged in front of a zoom lens 7 to be freely opened/closed. The zoom buttons 9T and 9W are used to adjust the extension amount of the zoom lens 7.

A menu switch (MENUSW) 10, a rewind switch 11, a self-timer switch 12, and date setting switches 13 and 14 are arranged on the rear surface of the camera main body 1. The menu switch 10 is operated to turn on/display various modes and information on the LCD panel 4. The rewind switch 11 is used to rewind a film midway. The self-timer switch 12 is operated to set a self-timer mode. The date setting switches 13 and 14 are used to set a date mode and correct the date. When the self-timer switch 12 is depressed once, a mark indicating the self-timer mode (to be described later) is displayed on the LCD panel 4, and the self-timer mode is set. When the self-timer switch 12 is depressed again, this mark disappears, and the self-timer mode is canceled. Note that the rewind switch 11 and the date setting switches 13 and 14 are located at a level slightly lower than the rear surface to prevent a user from unintentionally touching them.

Figures 4A, 4B:
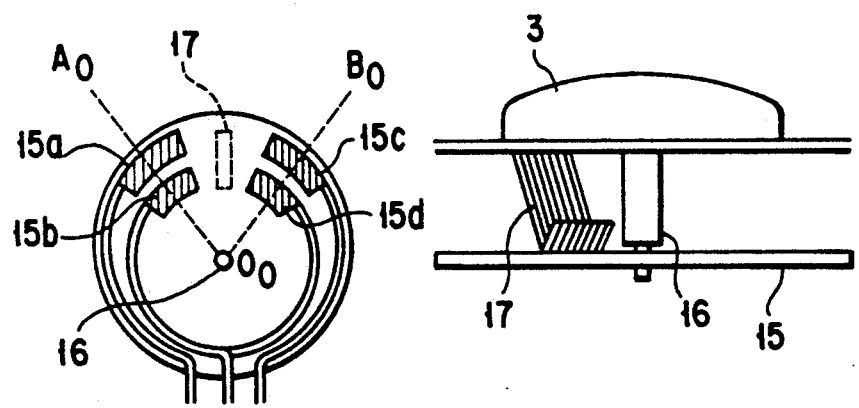
FIGS. 4A and 4B show the arrangement of a peripheral portion of a menu select dial 3.

FIGS. 4A and 4B show the arrangement of a peripheral portion of the menu select dial 3. The menu select dial 3 is constituted by a so-called shuttle dial. The menu select dial 3 is arranged on a pattern board 15 in the camera main body 1 to be freely pivoted about a shaft 16 through a predetermined angle in clockwise and counterclockwise directions. A contact piece 17 is fixed to a lower portion of the menu select dial to be located around the shaft 16 so as to be brought into contact with contact portions 15a to 15d formed on the pattern board 15.

When the contact piece 17 of the menu select dial 3 is rotated to a position $A_0 - O_0$, the contact portions 15a and 15b are turned on. When the contact piece 17 is rotated to a position $B_0 - O_0$, the contact portions 15c and 15d are turned on. With this operation, whether the menu select dial 3 is pivoted in the direction indicated by the arrow A or B in FIG. 1 is determined.

When the power switch 6 is turned on, as shown in FIGS. 2A and 2B, the power is turned on to display information about the camera on the LCD panel 4. In addition, the barrier 8 is opened, and the zoom lens 7 is extended to a wide-range position. When the zoom buttons 9T and 9W are operated at this time, a zooming operation can be performed.

Figure 5A:
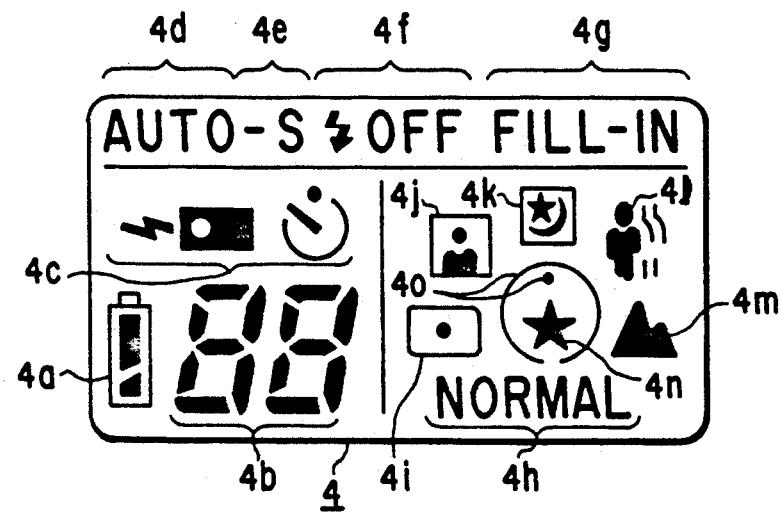

FIG. 5A shows a state wherein all the marks of the LCD panel 4 are displayed. The respective symbolized marks displayed on the LCD panel 4 will be described below.

Referring to FIG. 5A, reference numeral 4a denotes a battery check mark indicating the remaining charge of a battery. When the remaining charge is small, the mark 4a flickers. If no charge remains, only the lower side of the mark 4a is displayed. Reference numeral 4b denotes a mark indicating the frame count of a film; and 4c, a self-timer mark indicating a self-timer mode.

Marks 4d, 4e, 4f, and 4g respectively indicate flash modes. The mark 4d indicates an automatic flash mode, in which a flashing operation is performed when photography is performed in the dark or with back light. The mark 4e is displayed as "AUTO-S" together with the mark 4d, which indicates a pink-eye effect reduction mode. The mark 4f indicates a flash stop mode. The mark 4g indicates a forcible flash mode.

The marks 4h to 4o indicate subject modes. The mark 4h indicates a normal photographic mode; the mark 4i, a spot photometric mode; and the mark 4j, an automatic zoom mode. In the automatic zoom mode, when range measurement is performed by depressing the release button 2 to the first stroke, and the zoom lens 7 is automatically moved on the basis of the measurement result to set a subject image at a predetermined view angle with respect to a photographic frame.

The mark 4k indicates a night scene mode, in which the shutter speed is set to be lower than that determined by a camera shake limit in order to photograph a background as well as a subject even in a dark scene. The mark 4l indicates a mode for correcting a focus movement amount corresponding to the time lag between a releasing operation and a sector opening operation with respect to a moving subject.

The mark 4m indicates a mode in which the extension amount of the lens is fixed to the infinity distance to focus the camera on a subject in a remote scene. The mark 4n indicates a mode which can be added (e.g., a continuous photographic more or a multiple exposure photographic mode). The mark 4o is a mode in which the menu select dial 3 is imaged so that an operating direction coincides with a mode change.

Figure 5B:
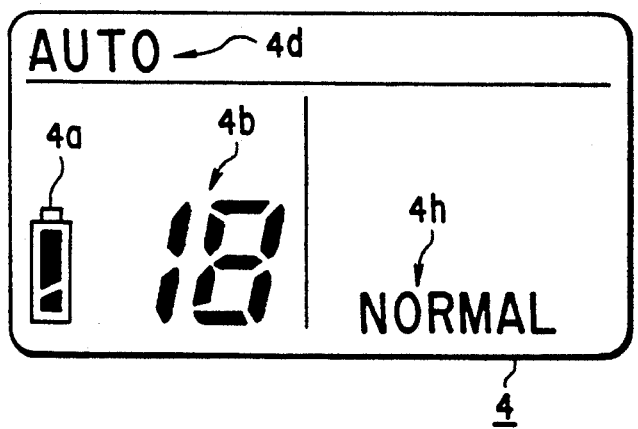

When the power switch 6 is turned on, all the marks 4a to 4o are displayed on the LCD panel 4, as shown in FIG. 5A. Subsequently, when the initial mode is initialized, a battery check result, a frame count of a film, "AUTO", and "NORMAL" represented by the marks 4a, 4b, 4d, and 4h are displayed, as shown in FIG. 5B. Note that if no film is loaded in the camera main body 1, "E" indicating an empty camera having no film inside is displayed as the mark 4b.

Figure 5C:
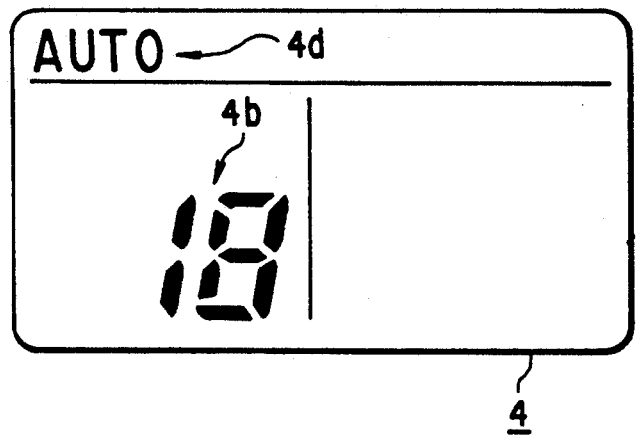

In this case, display of the mark 4h may be turned off after a lapse of one second. In addition, display of the battery check mark 4h may be turned off after a lapse of a predetermined period of time. In this state, the LCD panel 4 is set in the display state shown in FIG. 5C.

Subsequently, when the release button 2 is depressed to wind up a film (not shown), a displayed frame count is increased. If the rewind switch 11 is depressed, rewinding of the film is started, and the frame count is decreased.

Mode selection and display will be described below with reference to FIGS. 6A to 8C.

Figure 7A:
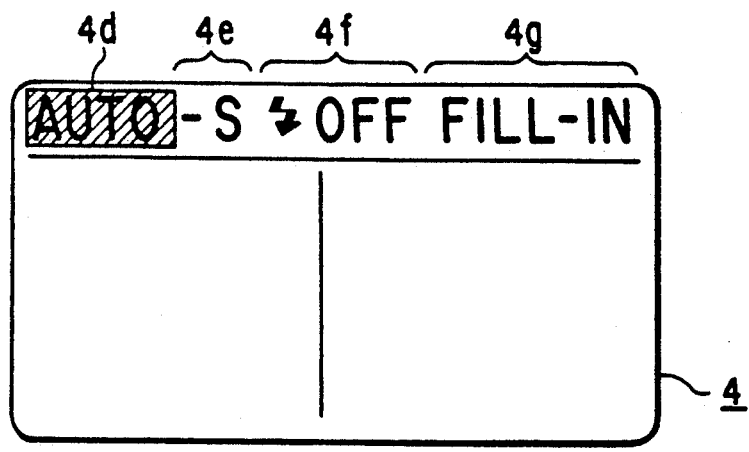

When the menu switch 10 is depressed, only the flash mode marks 4d to 4g are displayed on the LCD panel 4, while all the remaining marks are turned off, as shown in FIG. 7A. At this time, a mode to be set is flickering. Note that in each drawing, a hatched portion represents a flickering state. That is, in FIG. 7A, "AUTO" of the mark 4d is flickering.

Figure 6A:
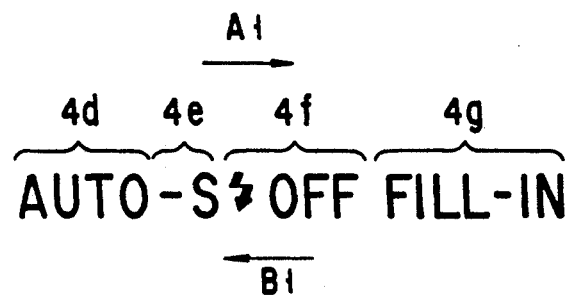
Figure 6B:
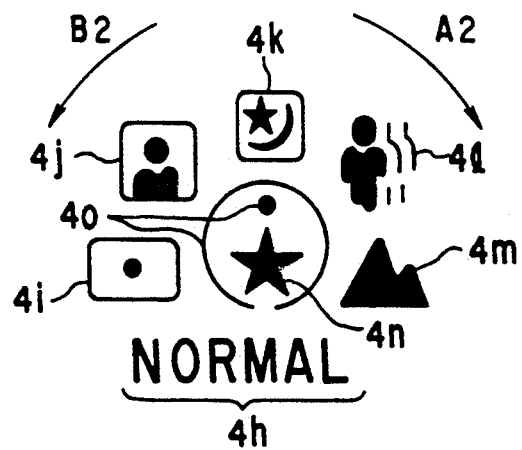

If the menu select dial 3 is rotated in the direction indicated by the arrow A in FIG. 1A to the stopper position once while the menu switch 10 is kept depressed, the flash mode changes from "AUTO" of the mark 4d (flickering) to "AUTO-S" of the marks 4d and 4e (flickering), as indicated by an arrow $A_l$ in FIG. 6A. When the menu select dial 3 is rotated again in the direction A, the mark 4f flickers. When the menu select dial 3 is further rotated, the mark 4g flickers. When the menu select dial 3 is further rotated, the mark 4d flickers again.

Figure 7B:
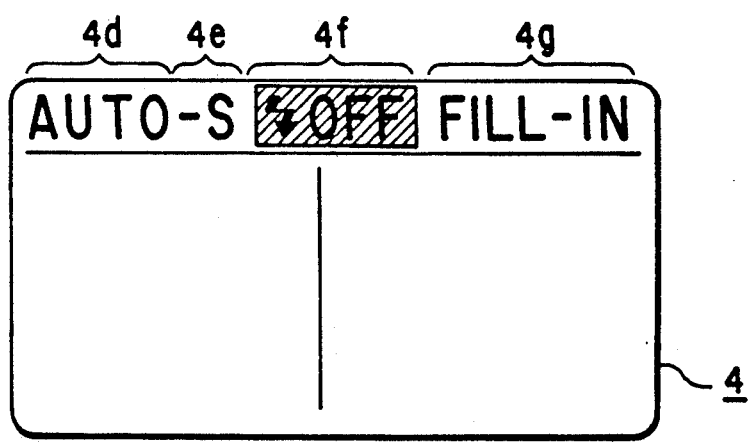
Figure 7C:
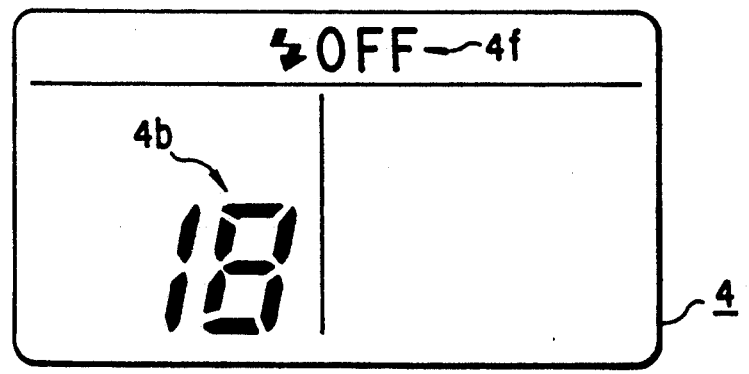

In contrast to this, if the menu select dial 3 is rotated in the direction indicated by the arrow B in FIG. 1A, the flickering portion in the display state of the flash mode changes as follows: mark 4d→mark 4g→mark 4f→mark 4d→mark 4e→mark 4d, as indicated by an arrow $B_l$ in FIG. 6A. At this time, as shown in FIG. 7B, the state of a mode to be set (the mark 4f in FIG. 7B) changes to a flickering state. When the menu switch 10 is released at the mode to be set, flickering is stopped, and the desired mode (the mark 4f in this case) is displayed, as shown in FIG. 7C.

Figure 8A:
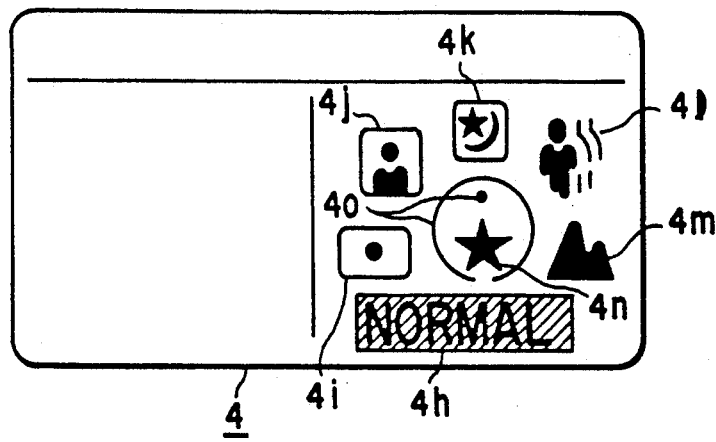

If the menu switch 10 is depressed again, the current display state is switched to a display state allowing a mode setting operation. If the normal photographic mode is currently set, the mark 4h is flickering, as shown in FIG. 8A. When the menu select dial 3 is rotated in the direction indicated by the arrow A in FIG. 1A while the menu switch 10 is kept depressed, the mode changes from the normal photographic mode of the mark 4h (flickering) to the spot photometric mode of the mark 4i (flickering), as indicated by an arrow $A_2$ in FIG. 6B.

When the menu select dial 3 is rotated again, the automatic zoom mode of the mark 4j flickers. Furthermore, the following marks sequentially flicker/are displayed on the LCD panel 4 as follows: mark 4k→mark 4l→mark 4m→mark 4n→mark 4h, thus changing the display state in accordance with a mode changing operation.

Figure 8B:
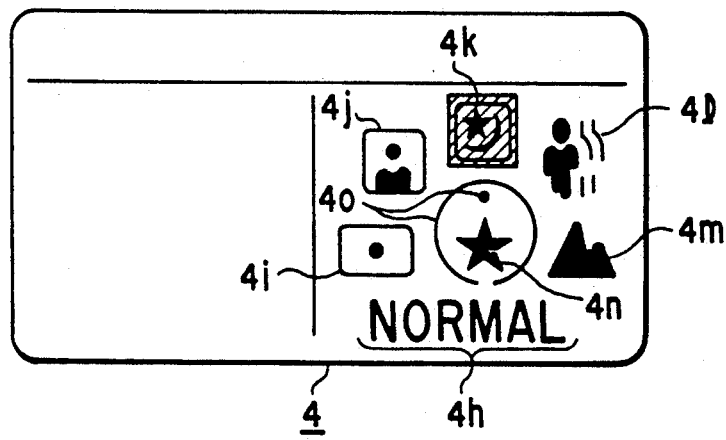
Figure 8C:
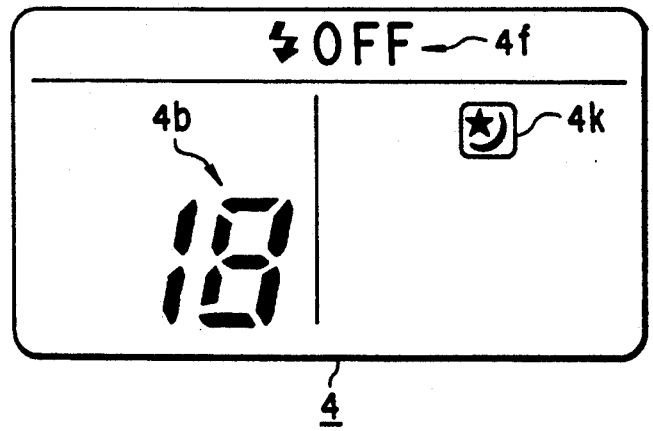

As is apparent, if the menu select dial 3 is rotated in the direction indicated by the arrow B in FIG. 1A, the mode changes in the reverse direction. That is, as indicated an arrow $B_2$ in FIG. 6B, the marks indicating modes to be set flicker/are displayed on the LCD panel 4 as follows: mark 4h→mark 4n→mark 4m→mark 4l→mark 4k→mark 4j→mark 4i→mark 4h. Although the menu select dial 3 may be rotated in either one of the directions indicated by the arrows A and B, if the dial 3 is stopped at the position of the mark 4k, as shown in FIG. 8B, only the corresponding portion flickers. When the menu switch 10 is released at the position of the mark 4k, the night scene photographic mode is set, as shown in FIG. 8C.

When a mode is set in the above-described manner, and a releasing operation is performed, and the menu switch 10 is depressed again, a mode setting is performed from the flash mode, as shown in FIG. 7A. In addition, after an automatic film loading operation, a mode setting can be started from the flash mode.

A control system for the camera will be described next.

FIG. 9 is a block diagram showing a control circuit for the camera to which the display apparatus of the present invention is applied. Referring to FIG. 9, a CPU 18 is constituted by a one-chip microcomputer for controlling the overall operation of the camera. The CPU 18 incorporates a RAM, a ROM, a counter, a timer, and the like and serves to perform sequence control of camera operations, automatic focusing (AF)/automatic exposure (AE) processing, analog/digital (A/D) conversion, LCD/light-emitting diode (LED) control, and switch input control. As described above, the LCD panel 4 is a liquid crystal display for displaying the frame count of a film, a battery check result, and the like.

A switch operating section 20 is constituted by various switches (to be described below). Reference symbols DA1SW and DA2SW denote date setting switches corresponding to the date setting switches 13 and 14 described above; IR(first release)SW, a switch which is turned on when the release button 2 is depressed to the first stroke, and is used as AF/AE mode locking switch; and 2R(second release)SW, a switch which is turned on when the release button 2 is depressed to the second stroke, and is used as a shutter releasing switch.

Reference symbol BKSW denotes an opening/closing switch of the back cover of the camera, which switch is designed to detect that the back cover is closed and cause the camera to perform idle feeding of a film; PWSW, a power on switch which is turned on to perform a predetermined display operation on the LCD panel 4 and activate the camera as a whole; ZUPSW, a zoom up switch; ZDWSW, a zoom down switch; and RWSW, a forcible film rewinding switch for causing the camera to forcibly rewind a film even if all the frames of the film have not been exposed yet.

Reference symbol MENUSW denotes a switch corresponding to the menu switch 10. When the switch MENUSW is turned on, the camera is caused to perform a display operation in mode selection or flash mode selection. Reference symbols MDUPSW and MDDWNSW respectively denote a mode up switch and a mode down switch (to be described in detail later) which are activated when the menu switch 10 is ON.

Reference symbol SELFSW denotes a self-timer switch. When the self-timer switch SELFSW is turned on once, the self-timer mode is set. When the first and second release switches 1RSW and 2RSW are turned on during this mode, the self-timer is started. When the self-timer switch SELFSW is depressed again while the self-timer is operating, the self-timer stops. When the self-timer switch SELFSW is depressed again during the self-timer mode, the mode is canceled.

A light-emitting diode (IRED) 22 and a position sensor (PSD) 23 are connected to the CPU 18 through an automatic focusing integrated circuit (AFIC) 21 for range measurement. The AFIC 21 radiates infrared light from the IRED 22 onto a subject 24 to be photographed, and detects the reflected light through the PSD 23, thus performing known active range measurement. The range measurement data obtained by this operation is transferred to the CPU 18 through a serial data bus.

An EEPROM 25 is a ROM in which data can be electrically erased. The EEPROM 25 stores the frame count of a film, an exposure correction value, flash charging voltage information, and various adjustment values such as battery check information. An automatic adjustment mechanism 26 is connected to the CPU 18 together with the EEPROM 25 through the serial data bus. The automatic adjustment mechanism 26 is used to as a checker when AF adjustment, AE adjustment, battery check adjustment, flash adjustment, and the like are performed in the factory for manufacturing the camera of the present invention. Each data is supplied to the CPU 18 through the serial data bus, and each adjustment value is stored in the EEPROM 25. A DX code of a film is read by the CPU 18 through a DX code reading section 19 so as to be used as an operation value for determining an exposure value.

An interface IC (IFIC) 27 is connected to the CPU 18 through the serial data bus. The IFIC 27 is an IC including known circuits, e.g., an LED drive circuit for driving an LED display section 28 for informing a user of a flashing operation, an AF locked state, and the like, a circuit for performing photometry and compression by using photocurrents from an SPD 29 as a light-receiving element, a motor drive circuit for driving motor driving ICs 30 and 31, and a reference voltage circuit.

Motor drive signals output from the CPU 18 are decoded in the IFIC 27 once and are respectively supplied to the motor driving ICs 30 and 31. A zoom motor 32, an AF motor 33, or a wind-up/rewind motor 34 is selected and driven in accordance with a signal from the CPU 18.

The zoom motor 32 is controlled by the CPU 18 using a signal from a zoom encoder constituted by a photo-interrupter (to be referred to as a PI hereinafter) 35 and a photo-reflector (to be referred to as a PR hereinafter) 36. A PI 37 and a PR 38 are respectively arranged for the AF motor 33 and the wind-up/rewind motor 34. The CPU 18 controls the respective motors by monitoring signals from the PI 37 and the PR 38.

Upon reception of a charge signal from the CPU 18, a charging operation of a flash unit 39 is started, and the charged voltage is then applied to the CPU 18. The voltage is A/D-converted in the CPU 18 and is subsequently compared with charged voltage information in the EEPROM 25 to check whether the charging operation is completed.

Reference numeral 40 denotes a plunger for opening/closing a sector (which is synonymous with "shutter" and is not shown). A voltage detecting section 41 serves to detect a battery voltage and reset the CPU 18 when a battery is loaded or voltage restoration is performed.

As a general LCD driving method, a $\frac{1}{4}$ duty, $\frac{1}{3}$ bias driving method is known. A display operation of the LCD panel 4 in this embodiment will be described below, provided that this driving method is used.

Figure 10:
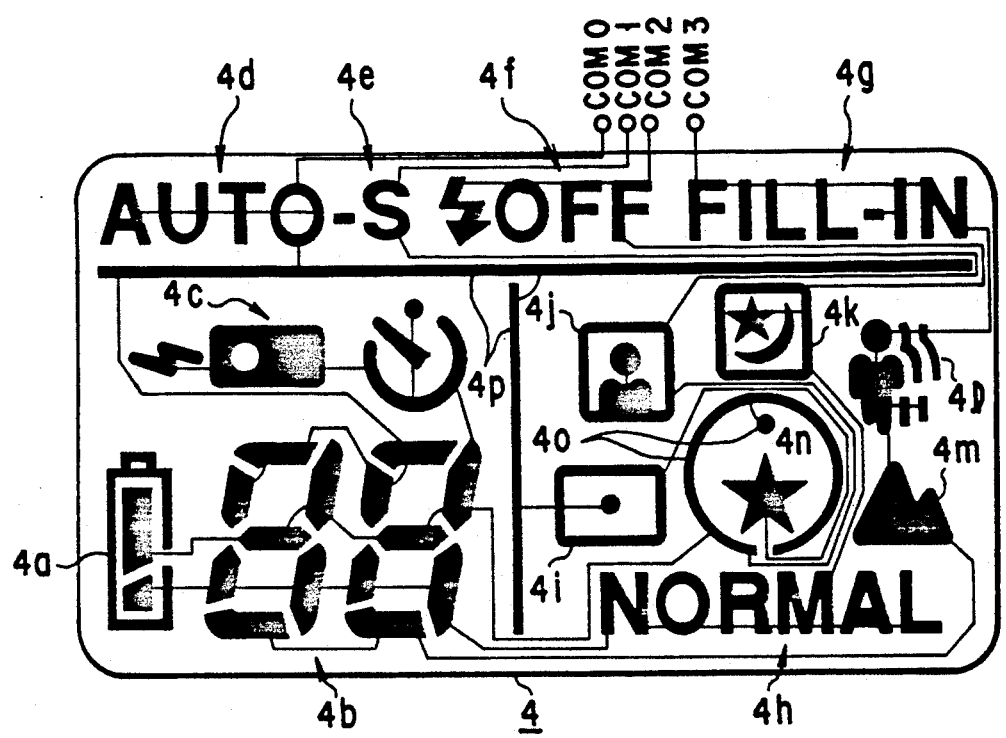
FIG. 10 is a view of the wiring arrangement of the LCD panel 4, illustrating common lines COM0 to COM3.
Figure 11:
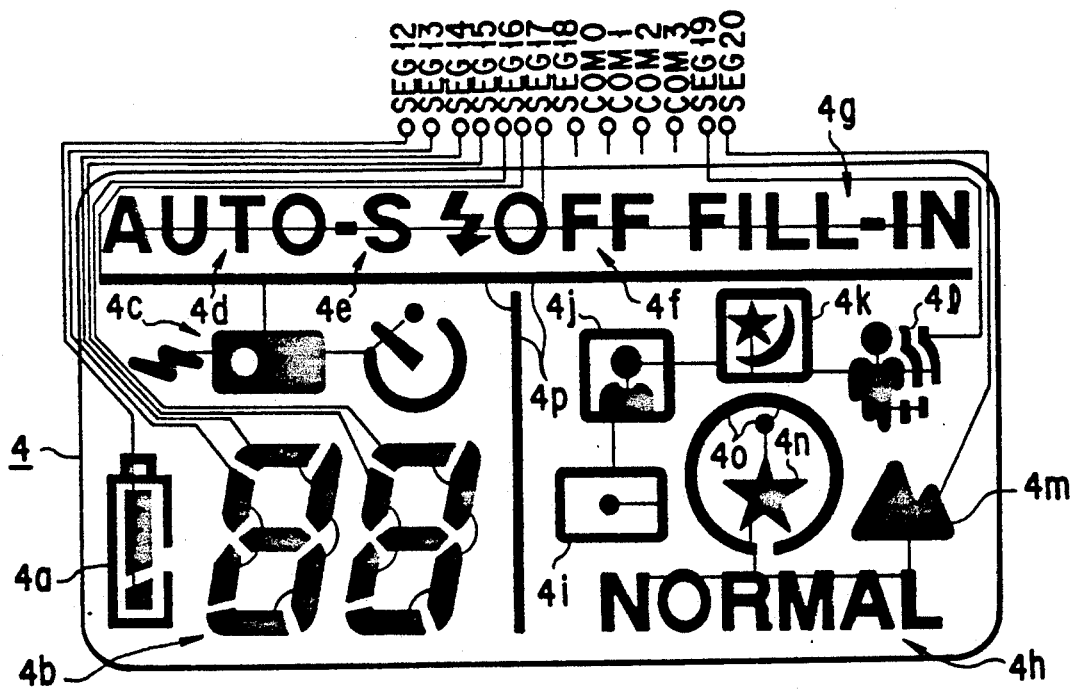
FIG. 11 is a view of the wiring arrangement of the LCD panel 4, illustrating segment lines SEG12 to SEG20.

Common lines COM0, COM1, COM2, and COM3 and segment lines SEG12, SEG13, . . . , SEG20 are arranged for the respective pixels which form the marks 4a to 4o of the LCD panel 4, as shown in FIGS. 10 and 11.

The CPU 18 includes a control section for controlling the common lines COM0, . . . , COM3 and the segment lines SEG12, . . . , SEG20. The respective pixels which form the marks 4a to 4o shown in FIG. 12 are allocated in units of bits in the RAM (not shown) of the CPU 18. In order to cause the LCD panel 4 to perform a display operation, "1" is set at a bit, of the RAM, which corresponds to a target pixel. A signal is then output from an LCD control section in the CPU 18 to the LCD panel 4 so as to display the target pixel. Note that if "0" is set at a bit of the RAM, the corresponding pixel is not displayed on the LCD panel 4.

For example, when the flash mode is to be selected, the lines of the T-shaped mark 4p shown in FIGS. 10 and 11 are displayed by setting data 1H at RAM address $5_H$, and the marks 4d to 4g are displayed by setting data $F_H$ at RAM address $6_H$. When $O_H$ is set at the remaining RAM addresses, only the marks 4d to 4g and 4p can be displayed on the LCD panel 4, as shown in FIG. 7A.

A power on reset operation, which is performed when the power to the camera is turned on, will be described below with reference to the flow chart shown in FIG. 13.

When the power to the camera is turned on by turning on the power switch 6, the CPU 18 starts to operate in accordance with the flow chart for power on reset processing shown in FIG. 13.

In step S1, the CPU 18 performs initial resetting operations such as a port setting operation, resetting of the IFIC 27, the AFIC 21, and the like, and a reading operation with respect to the EEPROM 25. In this case, the flags required for a display operation of the LCD panel 4 are set as follows: FMODF (flash mode flag)=1, FLCNT (flash mode counter)=0, and MDCNT (mode counter)=0.

In step S2, the CPU 18 checks the opening/closing switch BKSW of the back cover to check whether the opened state of the back cover has changed to the closed state. If the back cover is closed, the CPU 18 performs idle feeding of a film in step S3, and the flow then returns to step S2 again.

In step S4, the CPU 18 checks whether the forcible rewind switch RWSW is depressed. If the rewind switch is depressed, the CPU 18 performs a forcible rewind operation in step S5, and the flow then returns to step S2. If the switch is not depressed, the CPU 18 checks the state of the power on switch PWSW in step S6.

If the power switch is OFF, the CPU 18 stops an oscillator (not shown) in step S7 to set a stop mode. In this case, the CPU 18 turns off the display and the like as needed. In step S7, the CPU 18 is temporarily stopped. If an interruption is generated by the back cover switch, the forcible rewind switch, the power on switch, or the like in this state, the CPU 18 is started again, and the flow advances to step S8.

If it is determined in step S6 that the power on switch is ON, the CPU 18 checks in step S8 whether a signal is input from the first release switch 1RSW, the zoom up switch ZUPSW, the zoom down switch ZDWSW, the menu switch MENUSW, the self-timer switch (SELFSW), or the like of the switch operating section 20. If NO in step S8, the flow returns to step S2.

In step S9, the CPU 18 checks whether the switch 1RSW is turned on. If YES in step S9, the CPU 18 performs release processing in step S10. That is, the CPU 18 performs range measurement and photometric processing and turns on the LED display section 28. Assume that the second release switch 2RSW is turned on. In this case, if the self-timer mode is set, the CPU 18 executes a self-timer operation and subsequently performs a photographic operation in accordance with an exposure condition based on range measurement and photometric processing performed when the switch 1RSW is ON.

If NO in step S9, the CPU 18 checks in step S11 whether the switch ZUPSW or ZDWSW is depressed. If YES in step S11, the CPU 18 performs zoom processing in step S12. If the switch ZUPSW is depressed, the CPU 18 performs a zoom up operation. If the switch ZDWSW is depressed, the CPU 18 performs a zoom down operation.

If NO in step S11, the CPU 18 checks in step S13 whether the switch SELFSW is ON. If YES in step S12, the flow advances to step S14. In step S14, the CPU 18 sets the self-timer mode. If, however, the self-timer mode has already been set, the CPU 18 cancels the self-timer mode, as described above. When the self-timer mode is set, the CPU 18 displays the mark 4c on the LCD panel 4.

If it is also determined in step S13 that the switch SELFSW is not ON, the CPU 18 checks in step S15 whether the switch MENUSW is depressed. If YES in step S15, the CPU 18 performs a mode changing operation in step S16. If NO in step S15, the CPU 18 determines the corresponding signal as noise, and the flow returns to step S2.

Note that when the CPU 18 completes the processing in each of steps S10, S12, S14, and S16, the flow returns to step S2.

Figure 15:
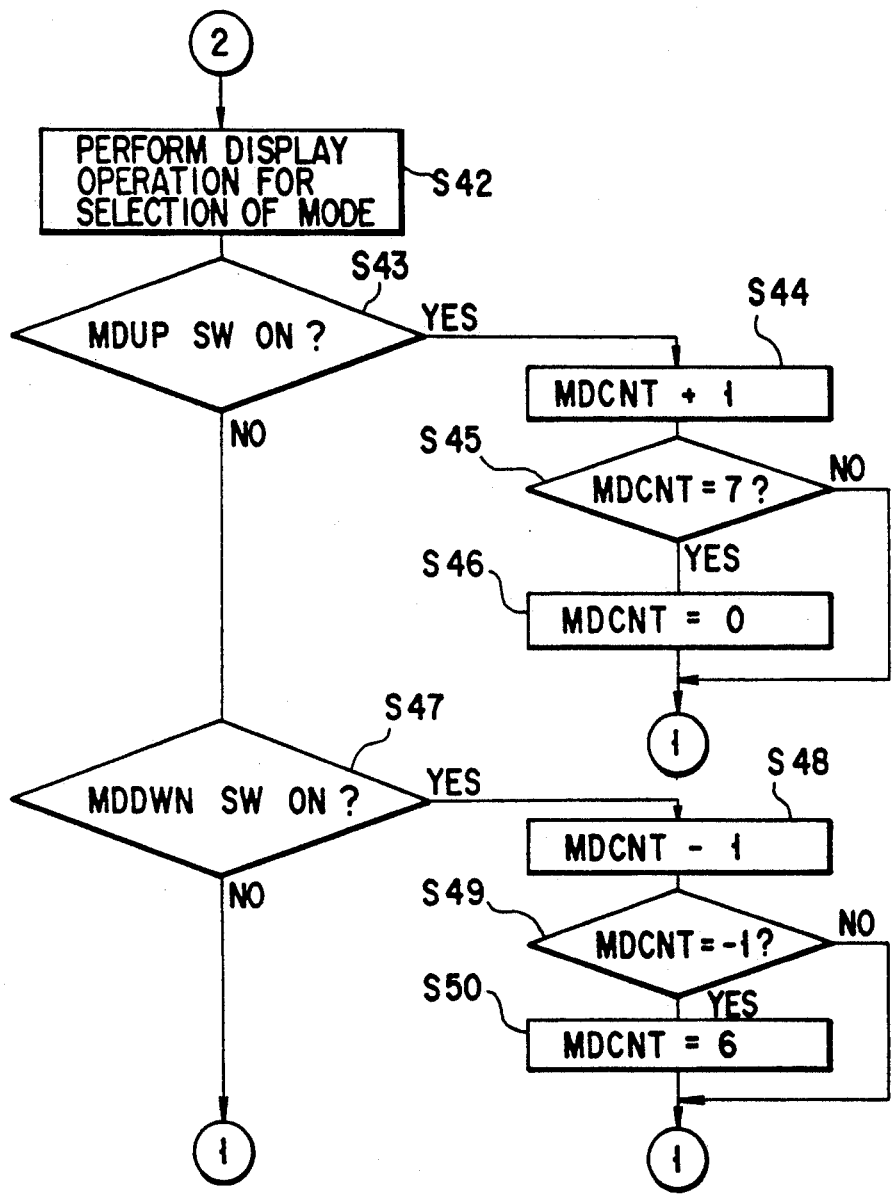
FIG. 15 is a flow chart of a subroutine for explaining mode change processing.

A mode changing operation will be described below with reference to the flow charts for subroutines shown in FIGS. 14 and 15.

In step S21, the CPU 18 checks whether a flash mode changing operation is to be performed or whether a subject mode changing operation is to be performed. Since the flash mode flag FMODF is set at "1" upon initialization, the CPU 18 determines a flash mode changing operation, and the flow advances to step S22. In step S22, the CPU 18 causes the LCD panel 4 to perform display of the flash mode, as shown in FIG. 7A.

After the flash mode display is performed in step S22, the CPU 18 checks in step S23 whether the mode up switch MDUPSW is depressed and turned on. This switch (not shown) is turned on when the menu select dial 3 is rotated in the direction indicated by the arrow A in FIG. 1A. If YES in step S23, the flow advances to step S24.

In step S24, the CPU 18 adds "1" to the counter FLCNT. Note that the counter FLCNT corresponds to each flash mode, as shown in FIG. 17. In step S25, the CPU 18 checks the counter FLCNT. If the count value of the counter FLCNT is "4", the flow advances to step S26. In step S26, the CPU 18 sets "0" in the counter FLCNT. That is, the CPU 18 restores the flickering state of the mark 4d, i.e., "AUTO", from the flickering state of the mark 4g, i.e., "FILL-IN". After this processing is completed, the flow advances to step S31.

If it is determined in step S23 that the switch MDUPSW is OFF, the CPU 18 checks in step S27 whether the mode down switch MDDWSW is depressed and turned on. This switch (not shown) is turned on when the menu select dial 3 is rotated in the direction indicated by the arrow B in FIG. 1A. If YES in step S27, the CPU 18 subtracts "1" from the counter FLCNT in step S28.

In step S29, the CPU 18 checks whether the count value of the counter FLCNT is "−1". If YES in step S29, the CPU 18 sets "3" in the counter FLCNT in step S30. That is, the flickering state of "AUTO" indicated by the mark 4d changes to the flickering state of the "FILL-IN" indicated by the mark 4g. After this processing is completed, the flow advances to step S31.

In step S31, the CPU 18 checks whether the switch MENUSW is ON. If YES in step S31, the CPU 18 checks the flash mode flag FMODF in step S32.

If FMODF=1 is determined in step S32, the CPU 18 flickers the flash mode in step S33. If FMODF=0, the flow advances to step S34 to flicker a subject mode. That is, as shown in FIGS. 7A and 7B, only the currently set mode flickers on the LCD panel 4.

Subsequently, in step S35, the CPU 18 checks whether 500 ms have elapsed. If NO in step S35, the flow returns to step S23. If YES in step S35, the CPU 18 checks a flag F50F in step S36. This flag F50F is set and reset every 0.5 seconds. If the flag F50F is "0", the CPU 18 sets "1" in the flag F50F in step S37. If it is determined in step S36 that the flag F50F is "1", the CPU 18 sets "0" in the same flag in step S38. Thereafter, the flow returns to step S23.

If it is determined in step S31 that the switch MENUSW is OFF, i.e., the menu switch 10 is released, the flow advances to step S39. In step S39, the CPU 18 checks the flag FMODF. If the flag FMODF is "1", the flow advances to step S40 to set the flag FMODF at "0". In contrast to this, if it is determined in step S39 that the flag FMODF is "0", the CPU 18 sets the flag at "1" in step S41. That is, every time the menu switch 10 is depressed, display of a flash mode changing operation and display of a subject mode changing operation are alternately performed on the LCD panel 4. Thereafter, the flow returns to the main flow chart in FIG. 13.

If it is determined in step S21 that the flag FMODF is "0", the CPU 18 performs a display operation for selecting a subject mode in step S42, as shown in FIG. 8A. Subsequently, in step S43, the CPU 18 checks whether the switch MDUPSW is turned on.

If YES in step S43, the CPU 18 adds "1" to the counter MDCNT in step S44. The counter MDCNT corresponds to each photographic mode, as shown in FIG. 18. The CPU 18 sets the respective modes during release processing to allow a photographic operation.

In step S45, the CPU 18 checks whether MDCNT=7. If YES in step S45, the CPU 18 sets MDCNT=0 in step S46. That is, the CPU 18 stops flickering the mark 4n from and starts flickering the mark 4h. After this processing, the flow advances to step S31.

If NO in step S43, the CPU 18 checks in step S47 whether the switch MDDWSW is ON. If NO in step S47, the flow advances to step S31. If YES in step S47, the flow advances to step S48.

In step S48, the CPU 18 subtracts "1" from the counter MDCNT. Only if MDCNT=1 is determined in step S49, the CPU 18 sets MDCNT=6 in step S50. That is, the CPU 18 stops flickering the mark 4h and starts flickering the mark 4n. After this processing, the flow advances to step S31.

Figure 16:
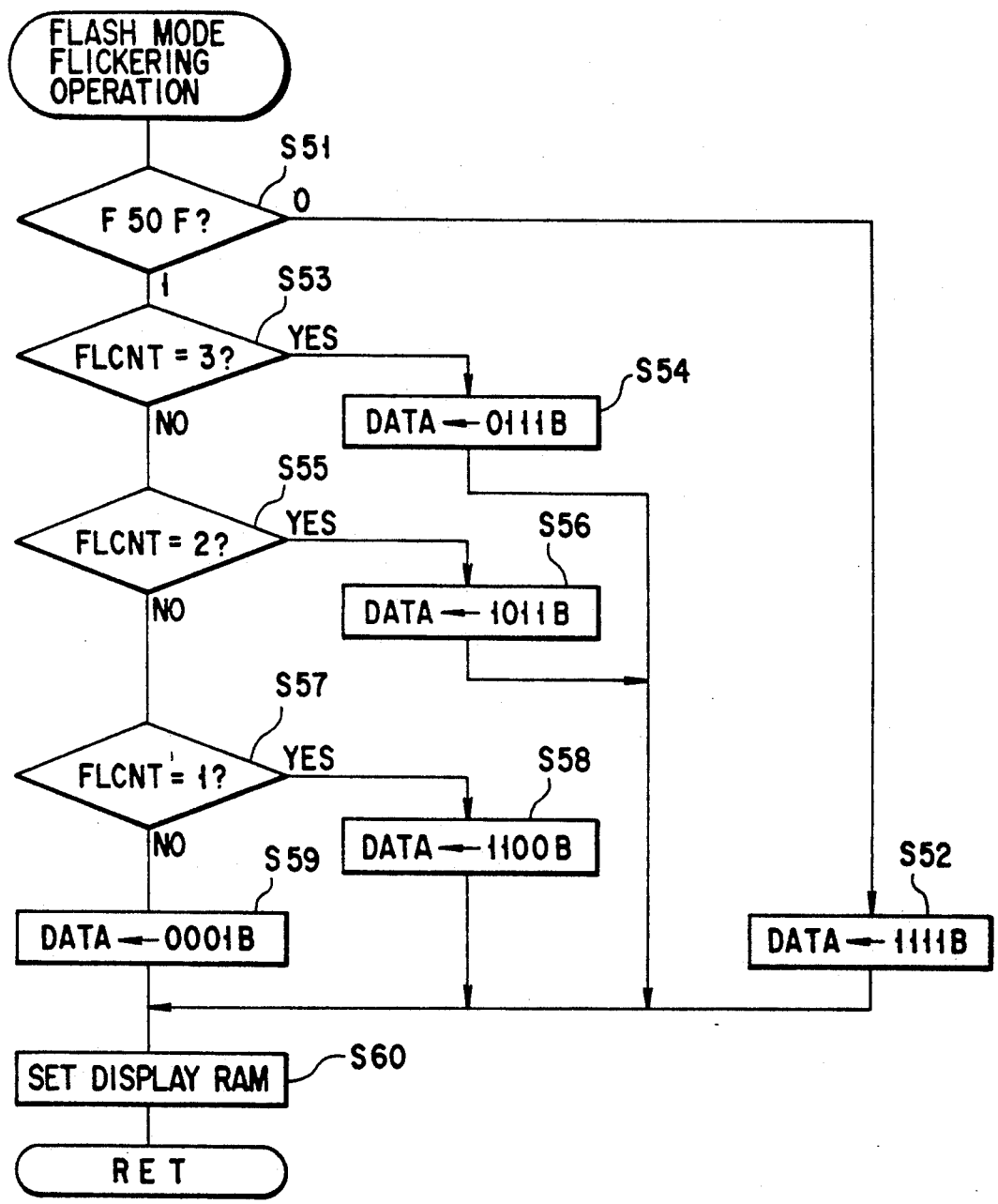
FIG. 16 is a flow chart of a subroutine for explaining a flash mode flickering operation.

A flash mode flickering operation will be described below with reference to the flow chart of the subroutine in FIG. 16.

Similar to step S36 described above, the CPU 18 checks the flag F50F. The CPU 18 checks this flag to flicker a displayed mark. If it is determined in step S36 that the flag F50F is "0", the flow advances to step S52 to set "1111B" in DATA (data). That is, the CPU 18 displays all the flash modes (the marks 4d, 4e, 4f, and 4g described above). Note that "B" in DATA represents "binary".

If the flag F50F is "1", the flow advances to step S53. In step S53, the CPU 18 checks whether the counter FLCNT is "3". If YES in step S53, the current flash mode is a forcible flash emission mode represented by the mark 4g. Therefore, the CPU 18 sets "0111B" in DATA in step S54.

If NO in step S53, the CPU 18 checks in step S55 whether FLCNT=2. If YES in step S55, since the current flash mode is a flash emission stop mode represented by the mark 4f, the CPU 18 sets "1011B" in DATA in step S56.

If NO in step S55, the CPU 18 checks in step S57 whether the count FLCNT is "1". IF YES in step S57, since the current mode is the pink-eye effect reduction mode represented by the marks 4e and 4d, the CPU 18 sets "1100B" in DATA in step S58.

If it is determined in step S57 that the counter FLCNT is not "1", i.e., the counter FLCNT is none of "1", "2", and "3", the CPU 18 sets "0001B" in DATA in step S59. That is, the current mode in this case is the automatic flash mode represented by the mark 4d.

The CPU 18 sets the data, set in steps S52, S54, S56, S58, and S59 in this manner, at display RAM address 6H in step S60. The CPU 18 then causes the LCD panel 4 to perform a display operation in accordance with the set data.

A flickering operation in flash mode display is performed in the above-described manner.

Since display of the subject modes is performed in the same manner as that of the flash modes described above, a detailed description thereof will be omitted.

As described above, according to the display apparatus for a camera according to the embodiment, when a selected mode is to be finally confirmed, only necessary information is displayed on the LCD panel 4 while display of other unnecessary information is not performed. In addition, in the process of a selecting operation, the types of modes which the camera has can be informed to the user. Therefore, confirmation of a mode to be selected can be reliably performed. Furthermore, since a mode selecting operation is executed only when both the menu switch 10 and the menu select dial 3 are operated under a predetermined condition, even if the user unintentionally touches one of them, the mode is not changed.

Moreover, according to the display apparatus for a camera of the embodiment, the menu select dial 3 is designed to be rotatable in two directions, and display of modes on the LCD panel 4 is performed such that the movement of the dial 3 and a mode changing operation coincide with each other, thereby preventing an operation error.

A modification of the first embodiment will be described next.

In this modification, zoom buttons 9T and 9W are used in place of the menu select dial 3 in the first embodiment. In addition, according to the modification, when the zoom button 9T is depressed while a menu switch 10 is kept depressed, the same state as that obtained when the menu select dial 3 in the first embodiment is rotated in the direction indicated by the arrow A in FIG. 1A can be obtained. If the zoom button 9W is depressed while the menu switch 10 is kept depressed, the same state as that obtained when the dial 3 is rotated in the direction indicated by the arrow B in FIG. 1A can be obtained. If the menu switch 10 is not depressed, the zoom buttons 9T and 9W serve as zoom switches. With this arrangement, almost the same function as that in the first embodiment can be realized without the menu select dial 3 in the first embodiment.

The second embodiment of the present invention will be described below.

Figure 19A:
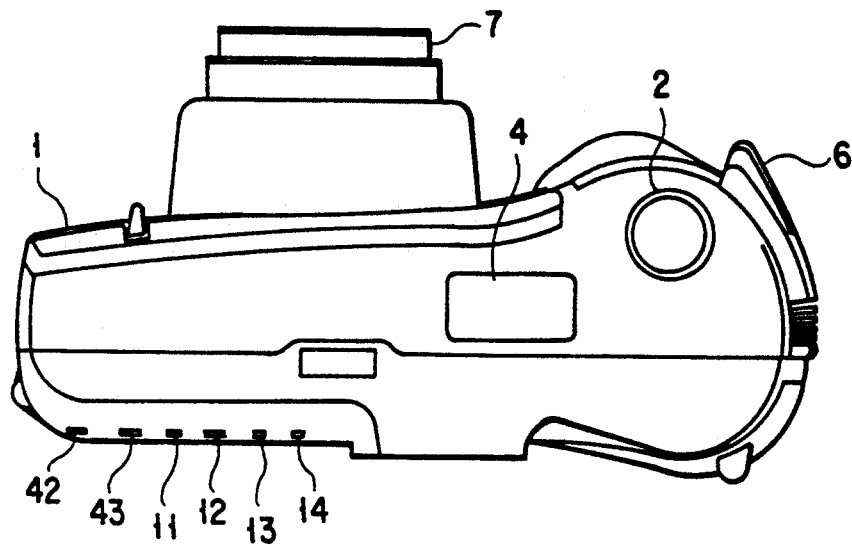
Figure 19B:
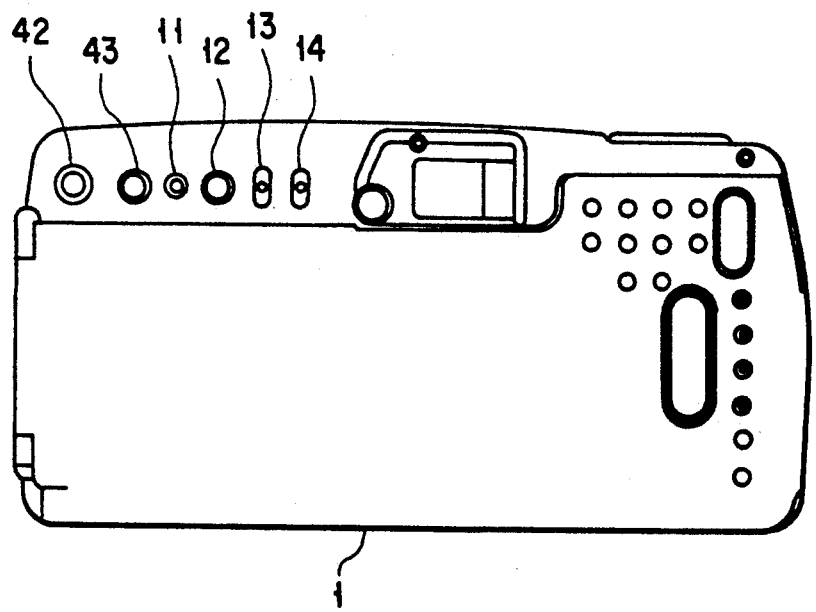

FIGS. 19A and 19B show the outer appearance of a camera according to the second embodiment. FIG. 19A is a top view of the camera. FIG. 19B is a rear view of the camera. The same reference numerals in the second embodiment denote the same parts as in the first embodiment, and a description thereof will be omitted.

Referring to FIGS. 19A and 19B, a rewind switch 11, a self-timer switch 12, date setting switches 13 and 14, a menu switch 42, and a select switch 43 are arranged on the rear surface of a camera main body 1. That is, the second embodiment has two mode setting switches. An LCD panel 4 is identical to the one in the first embodiment described above.

A normal display mode and display of flash modes or subject modes on the LCD panel 4 upon depression of the menu switch 42 are performed in the same manner as in the first embodiment. In this embodiment, by depressing the select switch 43 while depressing the menu switch 42, a mode can be arbitrarily selected from the flash modes and the subject modes. When the user releases the menu switch 42, the selected mode is set. Although selection of modes is performed in one direction, since no shuttle dial is used unlike the first embodiment, the overall cost of the apparatus can be reduced.

Figure 20:
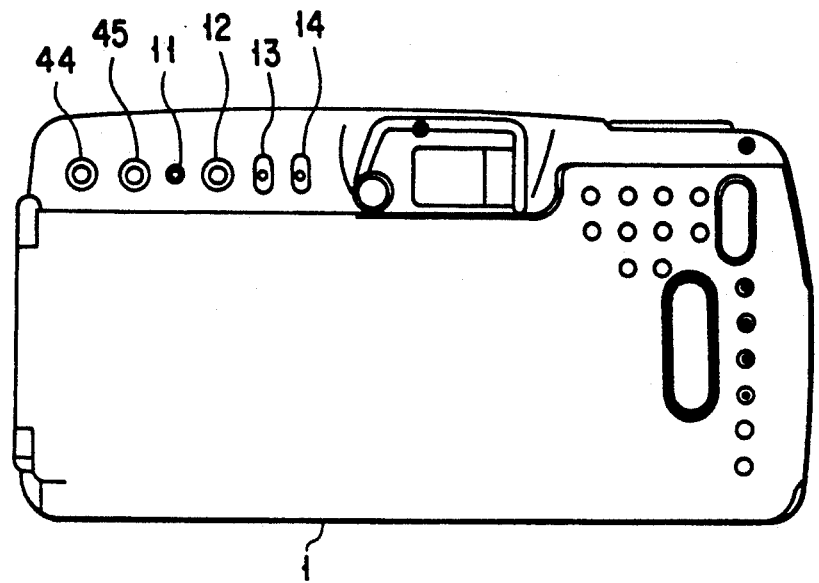
FIG. 20 is a rear view of a camera according to the third embodiment of the present invention.

FIG. 20 is a rear view of a camera according to the third embodiment of the present invention. The third embodiment is different from the second embodiment in that a flash switch 44 and a subject switch 45 are used in place of the menu switch 42 and the select switch 43 arranged in the rear surface of the camera main body 1.

In this embodiment, when the flash switch 44 and the subject switch 45 are kept depressed for two seconds or more, the respective modes are all displayed on an LCD panel 4, and the currently selected mode flickers.

If each of the switches 44 and 45 is depressed, modes can be sequentially selected. If each switch is not operated for 10 seconds or more or the other switch (the flash switch 44 during a selecting operation by means of the subject switch 45, and vice versa) is depressed, the currently selected mode is set.

Figure 21:
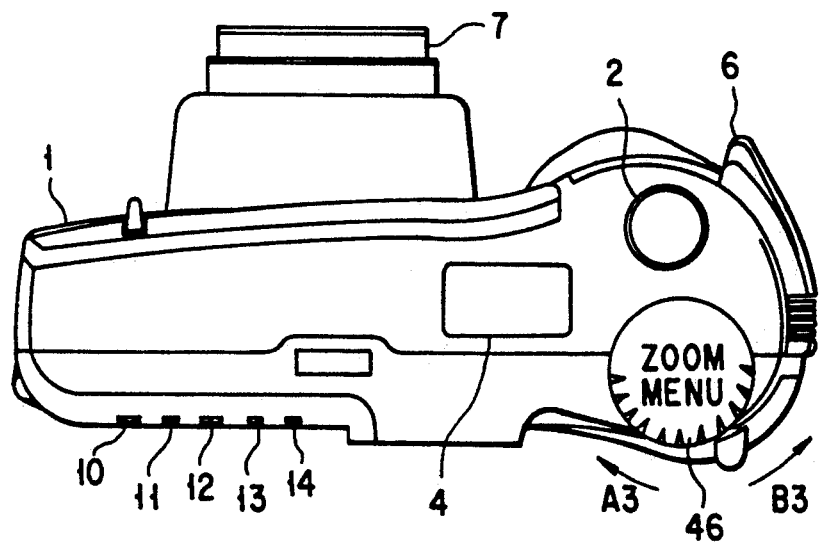
FIG. 21 is a top view of the camera according to the fourth embodiment of the present invention.

FIG. 21 is a top view of a camera according to the fourth embodiment of the present invention.

In contrast to the modification of the first embodiment, the fourth embodiment includes a zoom menu select dial 46 in place of the zoom buttons 9T and 9W. The zoom menu select dial 46 serves as a menu select dial while a menu switch 10 is depressed. While the menu switch 10 is not depressed, the zoom menu select dial 46 serves as a zoom dial, which is rotated in a direction indicated by an arrow $A_3$ in FIG. 21 to perform zooming in a wide-range direction, and is rotated in a direction indicated by an arrow $B_3$ to perform zooming in a telephoto-range direction.

As has been described above, according to the present invention, there is provided a mode selecting and displaying control apparatus for a camera capable of changing operation modes, which can inform a user of specific modes which can be set when the currently set mode is to be changed.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A mode selecting and displaying control apparatus for a camera, which selects a mode group from a plurality of photographic mode groups in photographing performed by a camera main body, and selects and displays one mode of a selected mode group, comprising:
   manually operable first operation means for selecting one mode group from the plurality of photographic mode groups and starting a mode selecting operation from a selected mode group;
   second operation means for selecting one mode from the selected mode group after the mode selecting operation is started upon manual operation of said first operation means;
   first display control means for displaying all modes belonging to the selected mode group in accordance with the manual operation of said first operation means;
   second display control means for flickering/displaying one mode selected in accordance with an operation of said second operation means; and
   third display control means for confirming the mode selecting operation in accordance with a releasing operation of said second operation means, and displaying only a selected mode.

2. An apparatus according to claim 1, wherein said camera main body includes a flash mode group associated with flash emission modes, and a subject mode group associated with photographic modes other than the flash modes, as the plurality of mode groups, and the flash mode group and the subject mode group are alternately selected in accordance with a manual operation of said first operation means.

3. An apparatus according to claim 1, wherein said second operation means can be operated in two directions, and said second display control means changes a mode to be flickering in accordance with an operating direction of said second operation means.

4. An apparatus according to claim 1, wherein said second operation means comprises an ON/OFF switch, and said second display control means changes a mode to be flickering in accordance with an ON/OFF operation of said ON/OFF switch.

5. An apparatus according to claim 1, wherein said second operation means comprises a member which can be manually operated in two directions and is also used as an operation member for executing a zooming operation of a photographic lens of said camera main body in a normal state, said second operation means executing a mode display changing operation only when said first operation means is manually operated.

6. A mode selecting and displaying control apparatus for a camera, which selects a mode from a plurality of photographic modes in photographing performed by a camera main body, and displays the selected mode, comprising:
   manually operable first operation means for starting a mode selecting operation from the plurality of photographic modes;
   second operation means for selecting one mode of the plurality of photographic modes after the mode selecting operation is started by said first operation means;
   first display control means for displaying all modes belonging to the plurality of photographic modes in accordance with the manual operation of said first operation means;
   second display control means for displaying one mode in a display state different from that of other modes in accordance with an operation of said second operation means; and
   third display control means for confirming the mode selecting operation in accordance with a releasing operation of said first operation means, and displaying only a selected mode.

7. An apparatus according to claim 6, wherein said camera main body includes a plurality of photographic mode groups, and the plurality of photographic mode groups are sequentially selected one by one in accordance with an operation of said first operation means.

8. A mode selecting and displaying control apparatus for a camera, comprising:
   a first switch for setting a mode group such as operation modes and flash modes of a camera main body in a changeable state;
   a second switch for changing a set mode of the mode group in a mode group changeable state set by said first switch; and
   display control means for displaying a set mode and setting other modes in a non-display state while said first switch is in a non-operated state, displaying the set mode in a selection display state indicating a selected state and displaying other modes in a display state different from that of the set mode while said first switch is in an operated state, and changing the set mode upon operation of said second switch.

9. An apparatus according to claim 8, wherein said second switch also serves as another operation member for said camera main body, said second switch serving as another operation member while said first switch is in a non-operated state, and serving as said second switch while said first switch is in an operated state.

10. An apparatus according to claim 9, wherein said another operation member comprises a zooming operation member included in said camera main body.

11. An apparatus according to claim 10, wherein said second switch comprises a shuttle dial which is rotatable from a neutral position in two directions.

12. An apparatus according to claim 10, wherein said second switch comprises a two-button push type switch.

13. An apparatus according to claim 8, wherein said first switch comprises a push button type switch.

14. An apparatus according to claim 13, wherein an operated state of said first switch is a state in which said first switch is depressed.

15. An apparatus according to claim 13, wherein an operated state of said first switch is a state in which said first switch is kept depressed for a period not less than a predetermined period of time, and said second switch is used together with said first switch.

16. An apparatus according to claim 8, wherein said second switch can be operated in two directions, and said display control means includes means capable of performing a mode selecting operation in two directions in accordance with an operation of said second switch.

17. A mode selecting and displaying control apparatus for a camera having a plurality of photographic modes, comprising:
first operation means for performing an output operation for a preparatory operation for selection of a photographic mode upon being operated;
second operation means for performing an output operation for a photographic mode changing operation upon being operated;
display means capable of simultaneously displaying the plurality of photographic modes; and
control means for causing said display means to simultaneously display the plurality of photographic modes in response to an output from said first operation means, displaying a currently selected photographic mode in a first display state indicating that the mode is selected while displaying other photographic modes in a second display state different from the first display state, switching the currently selected photographic mode to another photographic mode to be selected in response to an output from said second operation means, and changing the second display state of the selected photographic mode to the first display state, while displaying other photographic modes different from the selected photographic mode in the second display state.

18. An apparatus according to claim 17, wherein said display means comprises a liquid crystal display unit.

19. An apparatus according to claim 17, wherein the first display state is a flickering display state, and the second display state is a normal display state.

20. An apparatus according to claim 17, wherein said second operation member comprises a dial member which is rotatable in two directions, and said display means displays the respective photographic modes along a circumference, and moves the first display state on the circumference in accordance with a rotating direction of said dial member.

21. A mode selecting and displaying control apparatus for a camera having a plurality of photographic modes, comprising:
first operation means for performing an output operation for a preparatory operation for selection of a photographic mode upon being operated;
second operation means for performing an output operation for a photographic mode changing operation upon being operated;
display means capable of simultaneously displaying the plurality of photographic modes; and
control means for causing said display means to simultaneously display the plurality of photographic modes only during a period in which an output from said first operation means is received, displaying a currently selected photographic mode in a first display state indicating that the mode is selected while displaying other photographic modes in a second display state different from the first display state, switching the currently selected photographic mode to another photographic mode to be selected in response to an output from said second operation means, and changing the second display state of the selected photographic mode to the first display state, while displaying other photographic modes different from the selected photographic mode in the second display state.

22. An apparatus according to claim 21, wherein said display means comprises a liquid crystal display unit.

23. An apparatus according to claim 21, wherein the first display state is a flickering display state, and the second display state is a normal display state.

24. An apparatus according to claim 21, wherein said first and second operation means respectively comprise button members.

25. An apparatus according to claim 21, wherein said first operation means comprises a button member, and said second operation means comprises a dial member.

26. A mode selecting and displaying control apparatus for a camera, comprising:
display means for displaying a plurality of photographic modes provided in a camera main body;
a first switch for setting the photographic modes in a changeable state; and
display control means for displaying a set mode and setting other modes in a non-display state while said first switch is in a non-operated state, and displaying all the modes and setting a set mode in a display state different from that of other modes while said first switch is in an operated state.

27. An apparatus according to claim 26, wherein said display means comprises a liquid crystal display unit.

28. An apparatus according to claim 26, wherein said display control means displays a set mode in a flickering state different from a display state of other modes while said first switch is in an operated state.

29. An apparatus according to claim 26, further comprising a second switch for changing the modes one by one in a mode changeable state achieved upon operation of said first switch.

30. An apparatus according to claim 29, wherein said first switch is arranged on a rear surface of said camera main body, and said second switch is arranged on a top surface of said camera main body.

31. An apparatus according to claim 29, wherein said second switch is arranged on a rear surface side of said camera main body at a position between said first switch and a photographic lens of said camera main body.

32. An apparatus according to claim 29, wherein said second switch comprises a switch which can be operated in two directions.

33. An apparatus according to claim 29, wherein said second switch comprises a switch capable of performing a zooming operation with respect to a photographic lens of said camera main body by operating said second switch while said first switch is in a non-operated state.

34. An apparatus according to claim 29, wherein said display control means performs display control in such a manner that an operating direction of said second switch coincides with a direction in which display of a set mode is sequentially changed as a mode to be set is changed.

35. A display apparatus for a camera, which selects a mode from a plurality of photographic modes performed by a camera main body, and displays a selected mode, comprising:
   display means for displaying marks representing the plurality of photographic modes;
   first display control means for starting a selecting operation of selecting one mode from the plurality of photographic modes in accordance with a first operation, and causing said display means to set all the marks representing the plurality of photographic modes in a display state;
   second display control means for causing said display means to display one of all the marks representing the plurality of photographic modes in a display state which can be discriminated from the display state of other marks in accordance with a second operation; and
   third display control means for ending the selecting operation and causing said display means to set the mode selected by said second operation in a display state in accordance with a third operation.

36. An apparatus according to claim 35, further comprising a menu switch and a menu select dial, wherein the first operation corresponds to an ON operation of said menu switch, the second operation corresponds to a pivoting operation of said menu select dial during an ON operation of said menu switch, and the third operation corresponds to an OFF operation of said menu switch.

37. An apparatus according to claim 35, further comprising a menu switch and a menu select switch, wherein the first operation corresponds to an ON operation of said menu switch, the second operation corresponds to an ON/OFF operation of said menu select switch during an ON operation of said menu switch, and the third operation corresponds to an OFF operation of said menu switch.

38. An apparatus according to claim 35, further comprising a switch for selecting one of the mode groups, wherein the first operation corresponds to a continuous ON operation of said switch which is kept for a period not less than a predetermined period of time, the second operation corresponds to an ON/OFF operation of said switch after the first operation, and the third operation corresponds to an ON operation of a switch other than said switch or that said switch is not kept operated for a period not less than a second predetermined period of time.

39. An apparatus according to claim 35, further comprising a menu switch and a zoom dial for performing a zooming operation, wherein the first operation corresponds to an ON operation of said menu switch, the second operation corresponds to a pivoting operation of said zoom dial during an ON operation of said menu switch, and third operation corresponds to an OFF operation of said menu switch.

40. A display apparatus for a camera, comprising:
   display means capable of displaying modes of said camera;
   first control means for displaying only a set mode on said display means in a normal state; and
   second control means for displaying the set mode in a selection display state indicating a selected state and displaying other modes in a display state different from that of the set mode in an operated state; and
   wherein the selection display state is a flickering display state, and the display state different from that of the set mode is a normal display state.

41. A mode selecting and displaying control apparatus for a camera having a plurality of photographic modes, comprising:
   display means for displaying all the photographic modes;
   selecting operation means for selecting one of the photographic modes; and
   control means for displaying all the photographic modes while a photographic mode selecting operation is performed, and displaying a selected photographic mode or a photographic mode to be selected in a display state different from that of other photographic modes; and
   wherein the display state of the selected photographic mode or the photographic mode to be selected is a flickering display state, and the display state of other photographic modes is a normal display state.

42. An apparatus according to claim 41, wherein said display means comprises a liquid crystal display unit.

43. A mode selecting and displaying control apparatus for a camera, which selects a mode from a plurality of modes to be used for photography, comprising:
   display means having marks representing the plurality of modes;
   manual operation means which is operable in two directions to select one mode from the plurality of modes;
   display control means for setting all marks representing the plurality of modes, which said display means has in a display state, and cyclically displaying each of the marks in a display state different from that of the remaining marks in accordance with an operating direction of said operation means; and
   second manual operation means for causing said display control means to set all the marks of said display means in a display state in accordance with an operation of said second manual operation means.

44. A mode selecting and displaying control apparatus for a camera having a plurality of photographic modes, comprising:
   selecting operation means for selecting one of the plurality of photographic modes;

display means for displaying all the photographic modes; and control means for setting a photographic mode selection state upon operation of said selecting operation means to cause said display means to display all the photographic modes, displaying a selected photographic mode or a photographic mode to be selected in a display state different from that of other photographic modes while keeping the state, and for, when said selecting operation means is further operated in the state to switch the photographic mode to another photographic mode, setting the display state of the new photographic mode to be different from that of other photographic modes.

45. An apparatus according to claim 44, wherein said selecting operation means comprises a single button member.

46. An apparatus according to claim 44, wherein said display means comprises a liquid crystal display unit.

47. An apparatus according to claim 44, wherein the display state of the selected photographic mode or the photographic mode to be selected is a flickering display state, and the display state of other photographic modes is a normal display state.

48. A mode selecting and displaying control apparatus for a camera, comprising:

display means for displaying photographic modes of said camera; and a switch for changing the modes, said switch being operable in different operational directions; and wherein said display means has a plurality of pixels indicating the respective modes, and the plurality of pixels are arranged in a shape associated with the operational directions of said switch.

49. An apparatus according to claim 48, wherein said switch, comprises a dial.

50. A mode selecting and displaying control apparatus for a camera having a plurality of photographic modes, comprising:

first operation means for performing an output operation for a preparatory operation for selection of a photographic mode only during a period in which said operation means is operated;

second operation means for performing an output operation for a photographic mode changing operation when said second operation means receives an output from said first operating means and is operated;

display means capable of simultaneously displaying the plurality of photographic modes; and control means for causing said display means to simultaneously display the plurality of photographic modes upon reception of the output from said first operation means, displaying a currently selected photographic mode in a first display state indicating that the mode is selected while displaying other photographic modes in a second display state different from the first display state, switching the currently selected photographic mode to another photographic mode to be selected in response to an output from said second operation means, and changing the second display state of the selected photographic mode to the first display state, while displaying other photographic modes different from the selected photographic mode in the second display state.

51. An apparatus according to claim 50, wherein said display means comprises a liquid crystal display unit.

52. An apparatus according to claim 50, wherein the first display state is a flickering display state, and the second display state is a normal display state.

53. An apparatus according to claim 50, wherein said first and second operation means respectively comprise button members.

54. A mode selecting and display control apparatus for a camera, which selects a mode from a plurality of modes to be used for photography, comprising:

display means having marks representing the plurality of modes;

manual operation means which is operable in two directions to select one mode from the plurality of modes; and display control means for setting all marks representing the plurality of modes, which said display means has in a display state, and cyclically displaying each of the marks in a display state different from that of the remaining marks in accordance with an operating direction of said operation means; and wherein the different display state obtained by said display control means is obtained by flickering the mark.

* * * * *